(12) United States Patent
Shiina et al.

(10) Patent No.: US 12,136,323 B2
(45) Date of Patent: Nov. 5, 2024

(54) MONITORING SYSTEM, MONITORING METHOD, AND MONITORING PROGRAM

(71) Applicant: NIPPON TELEGRAPH AND TELEPHONE CORPORATION, Tokyo (JP)

(72) Inventors: Ryota Shiina, Musashino (JP); Tomohiro Taniguchi, Musashino (JP); Shinya Tamaki, Musashino (JP); Kazutaka Hara, Musashino (JP); Koji Tsuji, Musashino (JP); Tetsuya Suzuki, Musashino (JP); Yasutaka Kimura, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 165 days.

(21) Appl. No.: 17/927,500

(22) PCT Filed: May 27, 2020

(86) PCT No.: PCT/JP2020/020949
§ 371 (c)(1),
(2) Date: Nov. 23, 2022

(87) PCT Pub. No.: WO2021/240692
PCT Pub. Date: Dec. 2, 2021

(65) Prior Publication Data
US 2023/0215254 A1    Jul. 6, 2023

(51) Int. Cl.
*G08B 13/196* (2006.01)
*G06V 20/52* (2022.01)
(52) U.S. Cl.
CPC ........... *G08B 13/196* (2013.01); *G06V 20/52* (2022.01)

(58) Field of Classification Search
CPC ............................ G08B 13/196; G06V 20/52
(Continued)

(56) References Cited

PUBLICATIONS

Kensuke Kuraki et al., Technology for LED Lighting with Embedded Information on Objects, FUJITSU, vol. 66, No. 5, 2015, pp. 88-93, https://www.fujitsu.com/downloads/JP/archive/imgjp/jmag/vol66-5/paper12.pdf.

(Continued)

*Primary Examiner* — Nguyen T Truong
(74) *Attorney, Agent, or Firm* — Harness, Dickey & Pierce, P.L.C.

(57) ABSTRACT

The present disclosure provides a monitoring system including an edge processing apparatus including a space distinct ID management database, a space distinct ID control unit, a storage unit, an analysis unit, and an abnormality determination unit, and a controller, a transmitter, and a camera with sensor that are installed in a location to be monitored, in which the space distinct ID management database stores a space distinct ID and a transmission time of the space distinct ID in association with the location to be monitored, the space distinct ID control unit acquires the space distinct ID associated with the location to be monitored from the space distinct ID management database and transmits the space distinct ID that is acquired to the controller in the associated location to be monitored, the controller transmits the space distinct ID acquired from the space distinct ID control unit to the transmitter, the transmitter generates a signal based on the space distinct ID acquired from the controller and diffuses, in a space of the location to be monitored, the signal that is generated, the camera with sensor includes a sensor that captures an image of the location to be monitored where the camera with sensor is installed and receives the signal diffused by the transmitter, and the camera with sensor transmits a received signal received by the sensor to the storage unit, the storage unit (Continued)

stores the received signal received from the camera with sensor in association with the location to be monitored where the camera with sensor is installed, the analysis unit extracts a space distinct ID from the received signal stored in the storage unit and transmits the space distinct ID that is extracted to the abnormality determination unit in association with the location to be monitored, and the abnormality determination unit compares and determines whether there is a match between the space distinct ID associated with the location to be monitored from the analysis unit and current time, and the space distinct ID and the transmission time of the space distinct ID associated with the location to be monitored that are stored in the space distinct ID management database.

8 Claims, 10 Drawing Sheets

(58) Field of Classification Search
USPC ......................................................... 348/143
See application file for complete search history.

(56) References Cited

PUBLICATIONS

Tomoaki Shikakura et al., Research on the Perception of Lighting Fluctuation in a Luminous Offices Environment, Journal of the Illuminating Engineering Institute of Japan, vol. 85, No. 5, 2001, pp. 346-351.

Fig. 2

| ROOM TO BE MONITORED | CONTROLLER MAC ADDRESS | CONTROLLER IP ADDRESS | ASSOCIATED SPACE DISTINCT ID | SPACE DISTINCT ID TRANSMISSION TIME (TIME OF LAST TRANSMISSION) |
|---|---|---|---|---|
| ROOM A | 50-76-c8-c9-e8-6c | 192.168.0.10 | 1111000011110000 | 2020/01/30/12:30:00 |
|  |  |  | 1110110110101010 | 2020/01/30/12:31:00 |
|  |  |  | 0110110111101011 | 2020/01/30/12:32:00 |
| ROOM B | 20-56-c8-c9-e5-6a | 192.168.0.20 | 1010010110101010 | 2020/01/30/12:30:00 |
|  |  |  | 1110011110101010 | 2020/01/30/12:31:00 |
|  |  |  | 0010010110101000 | 2020/01/30/12:32:00 |
| ROOM C | 30-31-c8-c3-e8-6b | 192.168.0.30 | 1111000000001111 | 2020/01/30/12:31:00 |
| ... | ... | ... |  |  |
| ROOM K | 40-65-c8-c9-e8-8a | 192.168.0.50 | 0101101001011010 | 2020/01/30/12:31:00 |

Fig. 5

| EDGE PROCESSING UNIT | EDGE PROCESSING UNIT MAC ADDRESS | EDGE PROCESSING UNIT IP ADDRESS | EDGE PROCESSING UNIT MANAGEMENT USER | ROOM TO BE MONITORED |
|---|---|---|---|---|
| EDGE PROCESSING UNIT 1 | 10-cd-c8-c9-e8-6c | 192.168.100.1 | USER INFORMATION 1 | ROOM A<br>ROOM B<br>ROOM C |
| EDGE PROCESSING UNIT 2 | 50-cd-c8-c9-e8-6c | 192.168.100.2 | USER INFORMATION 2 | ROOM A<br>ROOM B |
| EDGE PROCESSING UNIT 3 | e1-cd-c8-c9-e8-6c | 192.168.100.3 | USER INFORMATION 3 | ROOM A<br>ROOM B<br>ROOM C |
| ... | | | | |
| EDGE PROCESSING UNIT N | 1a-cd-c8-c9-e8-6c | 192.168.100.5 | USER INFORMATION N | ROOM A |

MONITORING SYSTEM, MONITORING METHOD, AND MONITORING PROGRAM

CROSS-REFERENCE TO RELATED APPLICATIONS

This application is a 371 U.S. National Phase of International Application No. PCT/JP2020/020949, filed on May 27, 2020. The entire disclosures of the above applications are incorporated herein by reference.)

TECHNICAL FIELD

The present disclosure relates to a monitoring system, a monitoring method, and a monitoring program which monitor whether a security camera is properly installed.

BACKGROUND ART

In recent years, a remote camera system in which a security camera is installed to monitor monitoring objects remotely has become increasingly popular. As inexpensive and high-performance security cameras become available on the market, it has become easier for users to purchase and install security cameras by themselves.

CITATION LIST

Non Patent Literature

NPL 1: "Technology for LED Lighting with Embedded Information on Objects", Kensuke Kuraki et al., FUJITSU.60, 5, p. 88-93 (September 2015) https://www.fujitsu.com/downloads/JP/archive/imgjp/jmag/vol66-5/paper12.pdf NPL 2: "Research on the Perception of Lighting Fluctuation in a Luminous Offices Environment", Tomoaki Shikakura et al., Journal of Illuminating Engineering Institute of Japan, Vol. 85, No. 5, 2001, PP. 346-351

SUMMARY OF THE INVENTION

Technical Problem

Security cameras, which are easy to install, may be placed by a third party in a location not intended by the installer. Such security cameras that are easy to install, on the other hand, are also easy to remove, so that the security cameras may be intentionally moved to another location.

Thus, it is not easy for the installer to remotely confirm that the security camera is installed at an "originally intended position" as intended by the installer. It is also difficult to constantly monitor the security camera.

NPL 1 discloses an LED lighting technology in which an ID to identify an object is embedded in the LED light and, by emitting the LED light to the object, the ID is detected from the reflected light through image processing. This technology makes it possible to easily acquire information related to an object simply by photographing the object with the camera of a smart device.

Although NPL 1 discloses the technology to detect the ID from the reflected light, it does not disclose the technology to confirm that the camera is installed at an "originally intended position".

Therefore, the present disclosure aims to enable the installer to remotely confirm that the security camera is installed at the "originally intended position" as intended by the installer.

Means for Solving the Problem

In order to achieve the above object, the present disclosure provides a monitoring system including
an edge processing apparatus including a space distinct ID management database, a space distinct ID control unit, a storage unit, an analysis unit, and an abnormality determination unit, and
a controller, a transmitter, and a camera with sensor that are installed in a location to be monitored, in which
the space distinct ID management database stores a space distinct ID and a transmission time of the space distinct ID in association with the location to be monitored,
the space distinct ID control unit acquires the space distinct ID associated with the location to be monitored from the space distinct ID management database and transmits the space distinct ID that is acquired to the controller in the associated location to be monitored,
the controller transmits the space distinct ID acquired from the space distinct ID control unit to the transmitter,
the transmitter generates a signal based on the space distinct ID acquired from the controller and diffuses, in a space of the location to be monitored, the signal that is generated,
the camera with sensor includes a sensor that captures an image of the location to be monitored where the camera with sensor is installed and receives the signal diffused by the transmitter, and the camera with sensor transmits a received signal received by the sensor to the storage unit,
the storage unit stores the received signal received from the camera with sensor in associated with the location to be monitored where the camera with sensor is installed,
the analysis unit extracts a space distinct ID from the received signal stored in the storage unit and transmits the space distinct ID that is extracted to the abnormality determination unit in association with the location to be monitored, and
the abnormality determination unit compares and determines whether there is a match between the space distinct ID associated with the location to be monitored from the analysis unit and current time, and the space distinct ID and the transmission time of the space distinct ID associated with the location to be monitored that are stored in the space distinct ID management database.

In order to achieve the above object, the present disclosure provides an edge processing apparatus including
a space distinct ID management database,
a space distinct ID control unit,
a storage unit,
an analysis unit, and
an abnormality determination unit, in which
the space distinct ID management database stores a space distinct ID and a transmission time of the space distinct ID in association with a location to be monitored,
the space distinct ID control unit acquires the space distinct ID associated with the location to be monitored from the space distinct ID management database and transmits the space distinct ID that is acquired to the associated location to be monitored, the storage unit stores a received signal received from the associated location to be monitored in association with the associated location to be monitored, the analysis unit extracts a space distinct ID from the received signal stored in the storage unit and transmits the space distinct ID that is extracted to the abnormality determination unit in association with the location to be monitored, and the abnormality determination unit compares and determines whether there is a match between the space distinct ID associated with the location to be monitored from the analysis unit and current time, and the space distinct ID and the transmission time of the space distinct ID associated with the location to be monitored that are stored in the space distinct ID management database.

In order to achieve the above object, the present disclosure provides a monitoring method performed by a monitoring system including an edge processing apparatus including a space distinct ID management database, a space distinct ID control unit, a storage unit, an analysis unit, and an abnormality determination unit, and a controller, a transmitter, and a camera with sensor that are installed in a location to be monitored, the monitoring method including by the space distinct ID management database, storing a space distinct ID and a transmission time of the space distinct ID in association with the location to be monitored, by the space distinct ID control unit, acquiring the space distinct ID associated with the location to be monitored from the space distinct ID management database and transmitting the space distinct ID that is acquired to the controller in the associated location to be monitored, by the controller, transmitting the space distinct ID acquired from the space distinct ID control unit to the transmitter, by the transmitter, generating a signal based on the space distinct ID acquired from the controller and diffusing, in a space of the location to be monitored, the signal that is generated, by the camera with sensor including a sensor that captures an image of the location to be monitored where the camera with sensor is installed and receiving the signal diffused by the transmitter, transmitting a received signal received by the sensor to the storage unit, by the storage unit, storing the received signal received from the camera with sensor in association with the location to be monitored where the camera with sensor is installed, by the analysis unit, extracting a space distinct ID from the received signal stored in the storage unit and transmitting the space distinct ID that is extracted to the abnormality determination unit in association with the location to be monitored, and by the abnormality determination unit, comparing and determining whether there is a match between the space distinct ID associated with the location to be monitored from the analysis unit and current time, and the space distinct ID and the transmission time of the space distinct ID associated with the location to be monitored that are stored in the space distinct ID management database.

In order to achieve the above object, the present disclosure provides a monitoring program causing a computer to implement operations provided in the edge processing apparatus.

Effects of the Invention

According to the present disclosure, the installer can remotely confirm that the security camera is installed at the "originally intended position" as intended by the installer.

BRIEF DESCRIPTION OF DRAWINGS

FIG. 2 illustrates an example of a space distinct ID management database.

FIG. 5 illustrates an example of information held by a management server.

DESCRIPTION OF EMBODIMENTS

Hereinafter, embodiments of the present disclosure will be described in detail with reference to the drawings. Further, the present disclosure is not limited to the embodiments described below. These examples of the embodiments are merely examples, and the present disclosure can be implemented in forms in which various modifications and improvements are added based on knowledge of those skilled in the art. Constituent elements with the same reference signs in the specification and the drawings are assumed to be the same constituent elements.

First Embodiment

Figure 1:
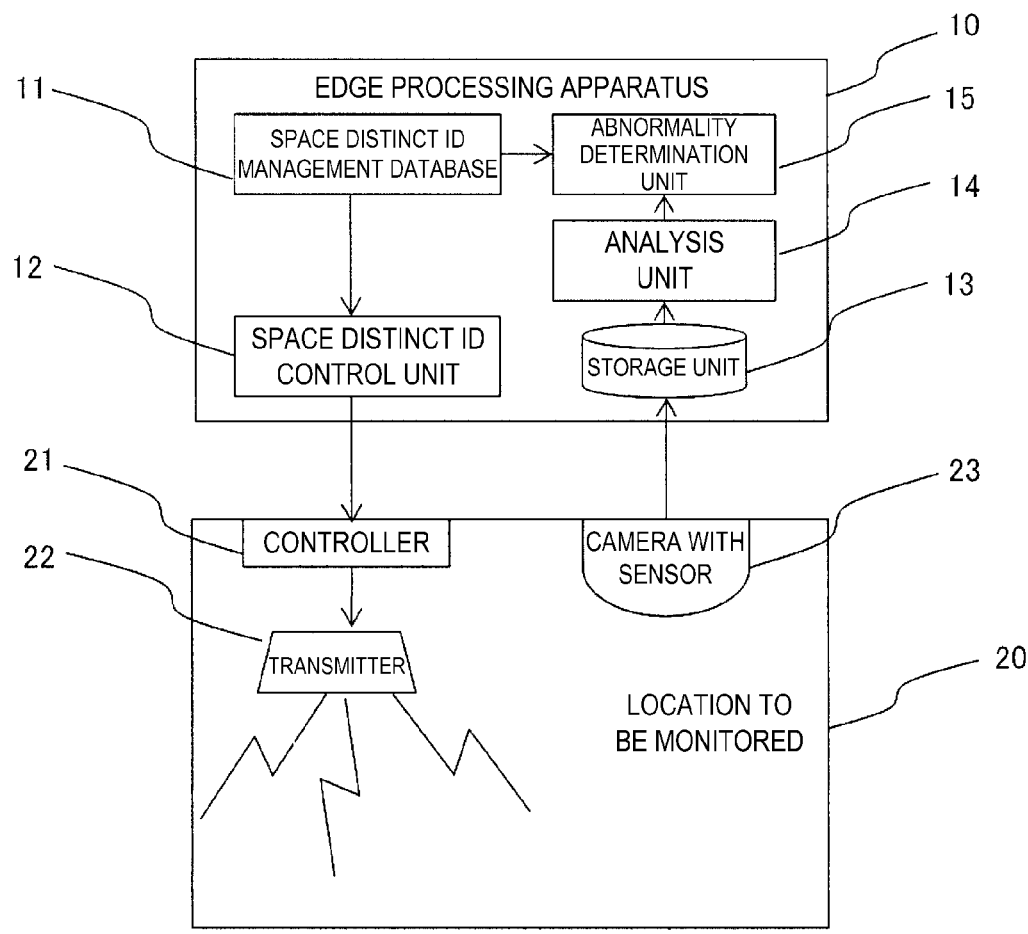
FIG. 1 illustrates a configuration example of a monitoring system according to an embodiment of the present disclosure.

FIG. 1 illustrates a configuration example of a monitoring system according to an embodiment of the present disclosure. FIG. 1 illustrates an edge processing apparatus 10 and a location to be monitored 20. The edge processing apparatus 10 includes a space distinct ID management database 11, a space distinct ID control unit 12, a storage unit 13, an analysis unit 14, and an abnormality determination unit 15. A controller 21, a transmitter 22, and a camera with sensor 23 are installed in the location to be monitored 20. The edge processing apparatus 10 according to the embodiment of the present disclosure can be implemented by using a computer and a program, and the program can be recorded in a recording medium or provided through a network. Hereinafter, a monitoring system and a monitoring method according to the embodiment of the present disclosure will be described.

In FIG. 1, the space distinct ID management database 11 stores the space distinct ID associated with the location to be monitored 20 and the transmission time of the space distinct ID. FIG. 2 illustrates an example of a space distinct ID management database 11. In FIG. 2, the space distinct ID management database 11 stores a MAC address and an IP address of the controller 21 installed in the location to be monitored 20 in association with a ROOM to be monitored as the location to be monitored 20. Furthermore, the space distinct ID associated with the controller 21 of each ROOM to be monitored and the transmission time of the space distinct ID are stored. When the space distinct ID is continuously transmitted, the last time the space distinct ID had been transmitted may be stored in the field of the transmission time.

Figure 3:
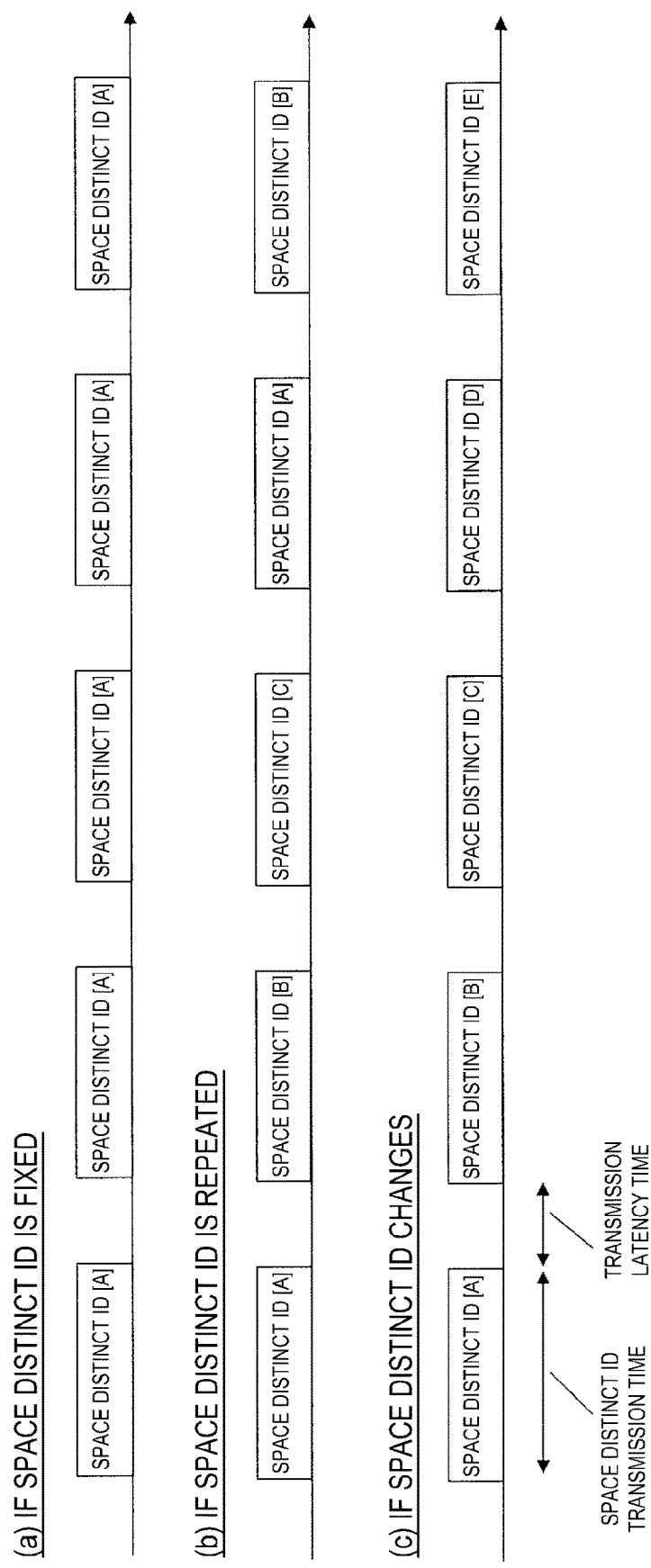
FIG. 3 illustrates an example of diffusing a space distinct ID.

The space distinct ID may change periodically or as needed, as in the item "ROOM A" or "ROOM B" or may be fixed as in the "ROOM C". For example, as illustrated at (a) of FIG. 3, when the space distinct ID is fixed, the space distinct ID [A] is transmitted during the space distinct ID transmission time, and, after the transmission latency time has elapsed, the space distinct ID [A] is transmitted again fixedly. The transmission latency time can be freely set. As illustrated at (b) of FIG. 3, when the space distinct ID is repeated, the space distinct ID [A], the space distinct ID [B], and the space distinct ID [C] are repeatedly transmitted for each transmission time of the space distinct ID. As illustrated at (c) of FIG. 3, when the space distinct ID changes, the space distinct ID [A], the space distinct ID [B], the space distinct ID [C], . . . , which are different for each transmission time of the space distinct ID, are transmitted.

The space distinct ID control unit 12 acquires, from the space distinct ID management database 11 in FIG. 2, the space distinct ID associated with the "ROOM A" as the location to be monitored 20 and transmits the acquired space distinct ID to the controller 21 in the location to be monitored 20. For example, the space distinct ID control unit 12 transmits the space distinct ID 1111000011110000 to the MAC address 50-76-c8-c9-e8-6c or IP address 192.168.0.10 of the controller 21 installed in the "ROOM A". In the field of the space distinct ID transmission time of the space distinct ID management database 11, the time at which the space distinct ID is transmitted is written. The space distinct IDs described above are exemplary and may be configured with any length and any code.

The controller 21 installed in the location to be monitored 20 receives the space distinct ID from the space distinct ID control unit 12 and transmits the acquired space distinct ID to the transmitter 22.

The transmitter 22 generates a signal based on the space distinct ID acquired from the controller 21 and diffuses the generated signal in the space of the location to be monitored 20. When the transmitter 22 diffuses the signal with light, the light is modulated in a known modulation format and diffused. When the transmitter 22 diffuses the signal with light in the visible light range, the modulation degree of the intensity modulation is set to 7% or less, or the modulation frequency of the intensity modulation is set to 30 Hz or higher, in order to prevent sensing by humans. The same is true when the modulation frequency is set to 30 Hz or higher in the phase modulation or the frequency modulation. When the light is included in the visible light range, it is also possible to use the light as a light source for illumination.

Alternatively, when the transmitter 22 diffuses the signal with light outside the visible light range, for example, infrared light, such light cannot be sensed by humans. When the transmitter 22 diffuses the signal on the radio wave, the radio wave is modulated in a known modulation format and diffused. When the transmitter 22 diffuses the signal on the sound wave, the sound wave of the frequency outside the audible range for humans is modulated in a known modulation format and diffused.

A camera itself of the camera with sensor 23 captures a monitoring object in the location to be monitored 20 where the camera with sensor 23 is installed. A sensor of the camera with sensor 23 has a receiving characteristic according to the signal to be diffused by the transmitter 22. The sensor of the camera with sensor 23 receives the signal diffused by the transmitter 22 and transmits the signal, as the received signal, to the storage unit 13 of the edge processing apparatus 10.

The storage unit 13 stores the received signal received from the camera with sensor 23, which corresponds to a location to be monitored, in association with the location to be monitored.

The analysis unit 14 cuts out part of the received signal stored in the storage unit 13 corresponding to a certain period of time, extracts the space distinct ID, and transmits the extracted space distinct ID to the abnormality determination unit 15 in association with the location to be monitored.

The abnormality determination unit 15 compares and determines whether there is a match between the space distinct ID associated with the location to be monitored from the analysis unit 14 and current time, and the space distinct ID and the transmission time of the space distinct ID associated with the location to be monitored that are stored in the space distinct ID management database 11. When there is a match, it is determined that the camera with sensor is installed at the "originally intended position". When there is no match, it is determined that the camera with sensor is not installed at the "originally intended position".

Thus, according to the monitoring system and the monitoring method of the embodiment of the present disclosure, the installer can remotely confirm that the security camera is installed at the "originally intended position" as intended by the installer.

The location to be monitored 20 in FIG. 1 includes one transmitter 22 for one controller 21 but may include a plurality of transmitters 22 for one controller 21. Furthermore, the location to be monitored 20 of FIG. 1 includes one camera with sensor 23 for one transmitter 22, but a plurality of cameras with sensors 23 may be provided for one transmitter 22. The same applies to embodiments described below.

Second Embodiment

Figure 4:
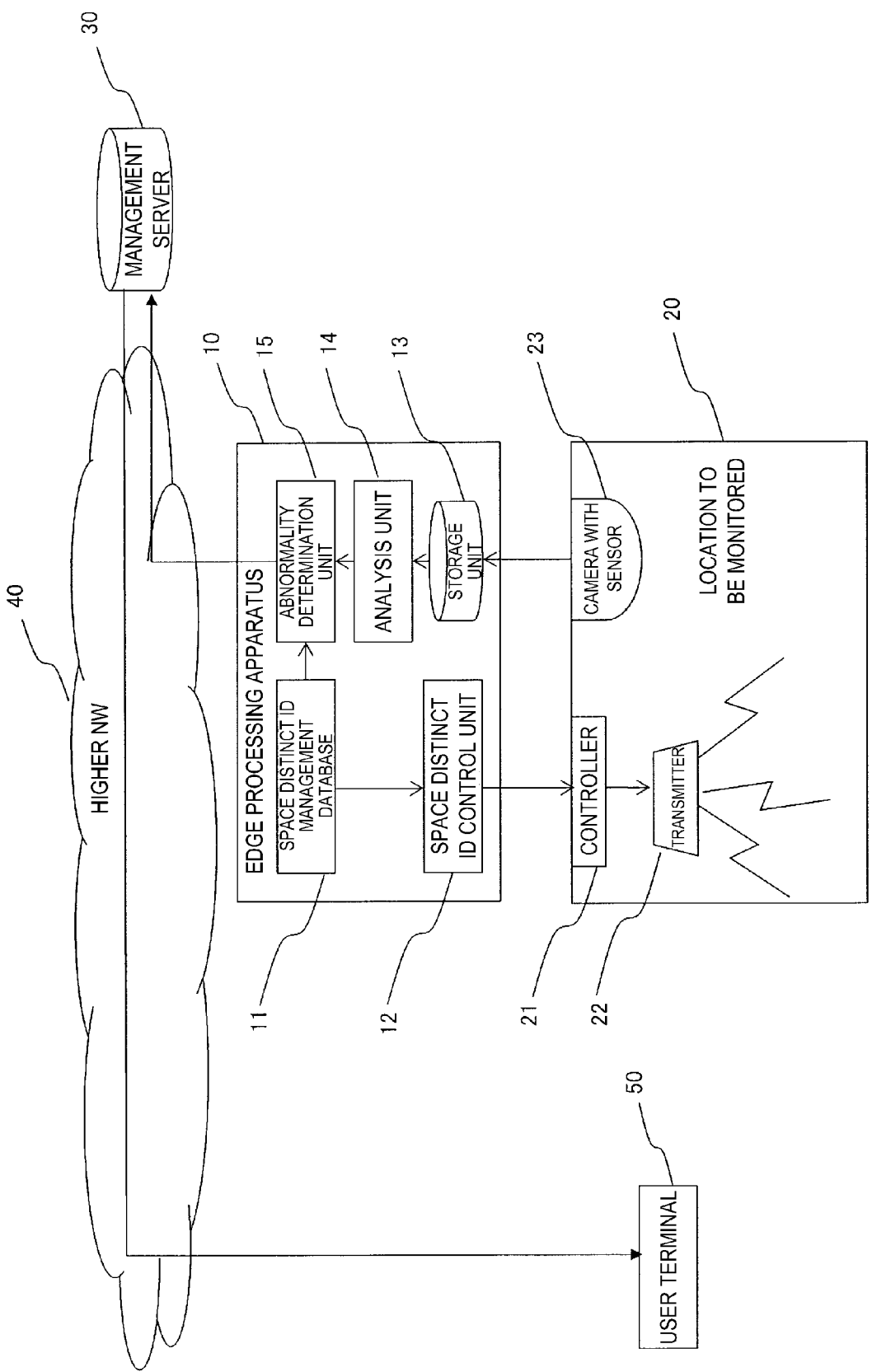
FIG. 4 illustrates a configuration example of a monitoring system according to an embodiment of the present disclosure.

FIG. 4 illustrates a configuration example of a monitoring system according to an embodiment of the present disclosure. FIG. 4 illustrates the edge processing apparatus 10, the location to be monitored 20, a management server 30, a higher network 40, and a user terminal 50. The edge processing apparatus 10 includes the space distinct ID management database 11, the space distinct ID control unit 12, the storage unit 13, the analysis unit 14, and the abnormality determination unit 15. A controller 21, a transmitter 22, and a camera with sensor 23 are installed in the location to be monitored 20. The edge processing apparatus 10 according to the embodiment of the present disclosure can be implemented by using a computer and a program, and the program can be recorded in a recording medium or provided through a network. Hereinafter, a monitoring system and a monitoring method according to the embodiment of the present disclosure will be described.

The difference from the first embodiment is that the monitoring system according to the embodiment of the present disclosure further includes the management server 30.

When there is no match between the space distinct ID associated with the location to be monitored from the analysis unit 14 and the current time, and the space distinct ID and the transmission time of the space distinct ID associated with the location to be monitored that are stored in the space distinct ID management database 11, the abnormality determination unit 15 of the edge processing apparatus 10 transmits abnormality and an unmatched location to be monitored to the management server 30 which is provided external to the edge processing apparatus 10.

FIG. 5 illustrates an example of a database held by the management server 30. In FIG. 5, MAC addresses and IP addresses assigned to the edge processing apparatuses 10 are stored. The "ROOM A" and the like, which are associated with the edge processing apparatus 10, are stored as the locations to be monitored 20 under the control of the edge processing apparatus 10. The edge processing apparatus 10 may control a plurality of locations to be monitored.

When receiving the abnormality and the unmatched location to be monitored from the edge processing apparatus 10, the management server 30 acquires the corresponding user information from the database illustrated in FIG. 5. After acquiring the user information, the management server 30 transmits an alert indicating abnormal states aggregated from the abnormality determination unit 15 through the higher network 40 to the user terminal 50 corresponding to the user information. When the user terminal 50 receives the alert, the user can know that the camera with sensor 23 is not installed at the "originally intended position".

When there is a match between the space distinct ID associated with the location to be monitored from the analysis unit 14 and the current time, and the space distinct ID and the transmission time of the space distinct ID associated with the location to be monitored that are stored in the space distinct ID management database 11, the abnormality determination unit 15 of the edge processing apparatus 10 may transmit normality and a matched location to be monitored to the management server 30. The management server 30, which has acquired the user information, may transmit "normal", through the higher network 40, indicating normal states aggregated from the abnormality determination unit 15 to the user terminal 50 corresponding to the user information. When the user terminal 50 receives "normal", the user can know that the camera with sensor 23 is installed at the "originally intended position".

Thus, according to the monitoring system and the monitoring method of the embodiment of the present disclosure, the installer can remotely confirm that the security camera is installed at the "originally intended position" as intended by the installer.

Third Embodiment

Figure 6:
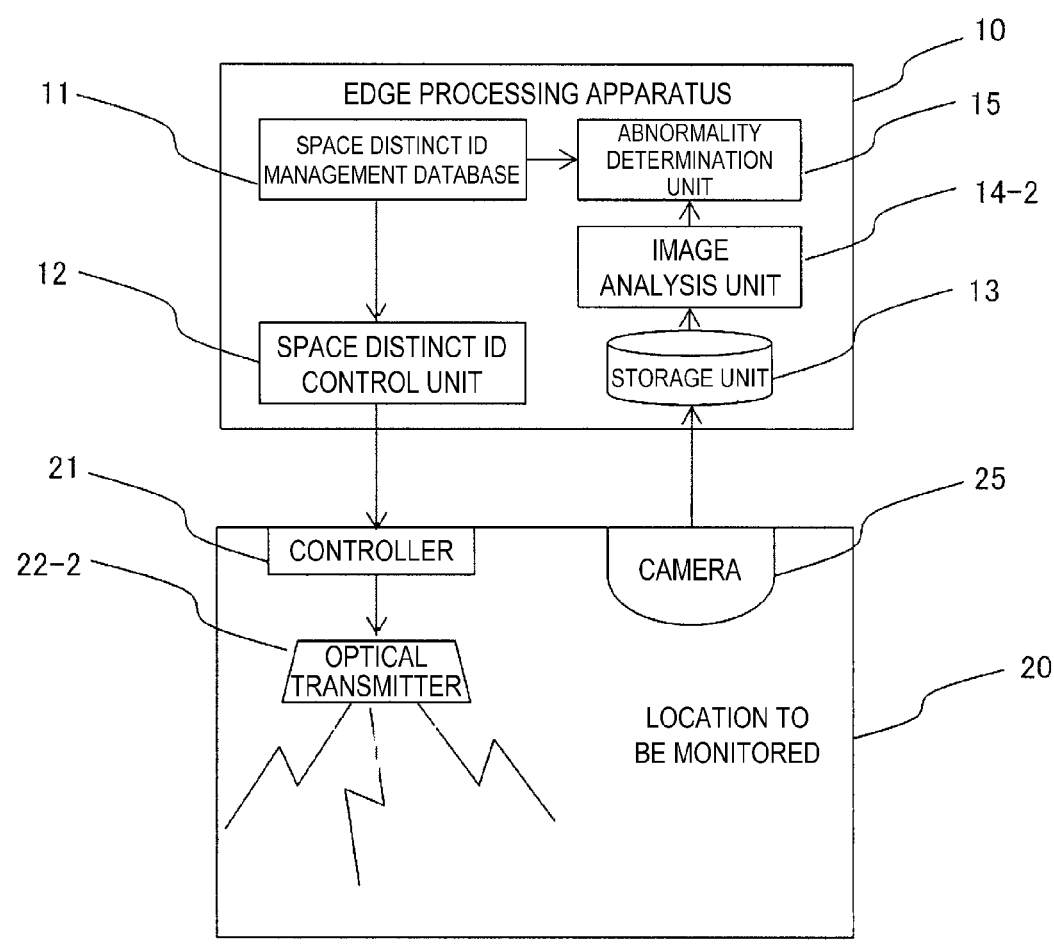
FIG. 6 illustrates a configuration example of a monitoring system according to an embodiment of the present disclosure.

FIG. 6 illustrates a configuration example of a monitoring system according to an embodiment of the present disclosure. FIG. 6 illustrates the edge processing apparatus 10 and the location to be monitored 20. The edge processing apparatus 10 includes the space distinct ID management database 11, the space distinct ID control unit 12, the storage unit 13, an image analysis unit 14-2, and the abnormality determination unit 15. The controller 21, an optical transmitter 22-2, and a camera 25 are installed in the location to be monitored 20. The edge processing apparatus 10 according to the embodiment of the present disclosure can be implemented by using a computer and a program, and the program can be recorded in a recording medium or provided through a network. Hereinafter, a monitoring system and a monitoring method according to the embodiment of the present disclosure will be described.

In the monitoring system illustrated in FIG. 6 according to the embodiment of the present disclosure, the space distinct ID management database 11, the space distinct ID control unit 12, the abnormality determination unit 15, and the controller 21 are similar to those of the first embodiment. In the location to be monitored 20, the optical transmitter 22-2 provided as the transmitter generates an optical signal based on the space distinct ID acquired from the controller 21 and diffuses the generated optical signal in the space of the location to be monitored. The camera 25 does not include a sensor for receiving the optical signal, and the camera 25 itself captures the image of the monitoring object in the location to be monitored 20 while operating as a sensor to sense the optical signal.

The optical signal, when it is in the visible light range, does not cause discomfort to humans if the fluctuation of the optical signal has the modulation degree that is not to be perceptible to humans. According to NPL 2, the optical modulation degree is desirably 20% or less. At this level, humans cannot perceive the fluctuation of the light intensity in a situation where they are concentrating on some tasks. More desirably, the optical modulation degree is 7% or less. At this level, humans cannot perceive the fluctuation of the light intensity regardless of their activity status. Alternatively, the humans cannot sense the modulation frequency of the intensity modulation of 30 Hz or higher. The same is true if the modulation frequency of phase modulation or frequency modulation is set to 30 Hz or higher. In the visible light range, the optical transmitter 22-2 may also be used as a light source for illumination. If the camera 25 can detect the infrared light, the optical signal of the infrared light may be used. When the light is outside the visible light range, for example, infrared light, the humans cannot sense the light.

Figure 7:
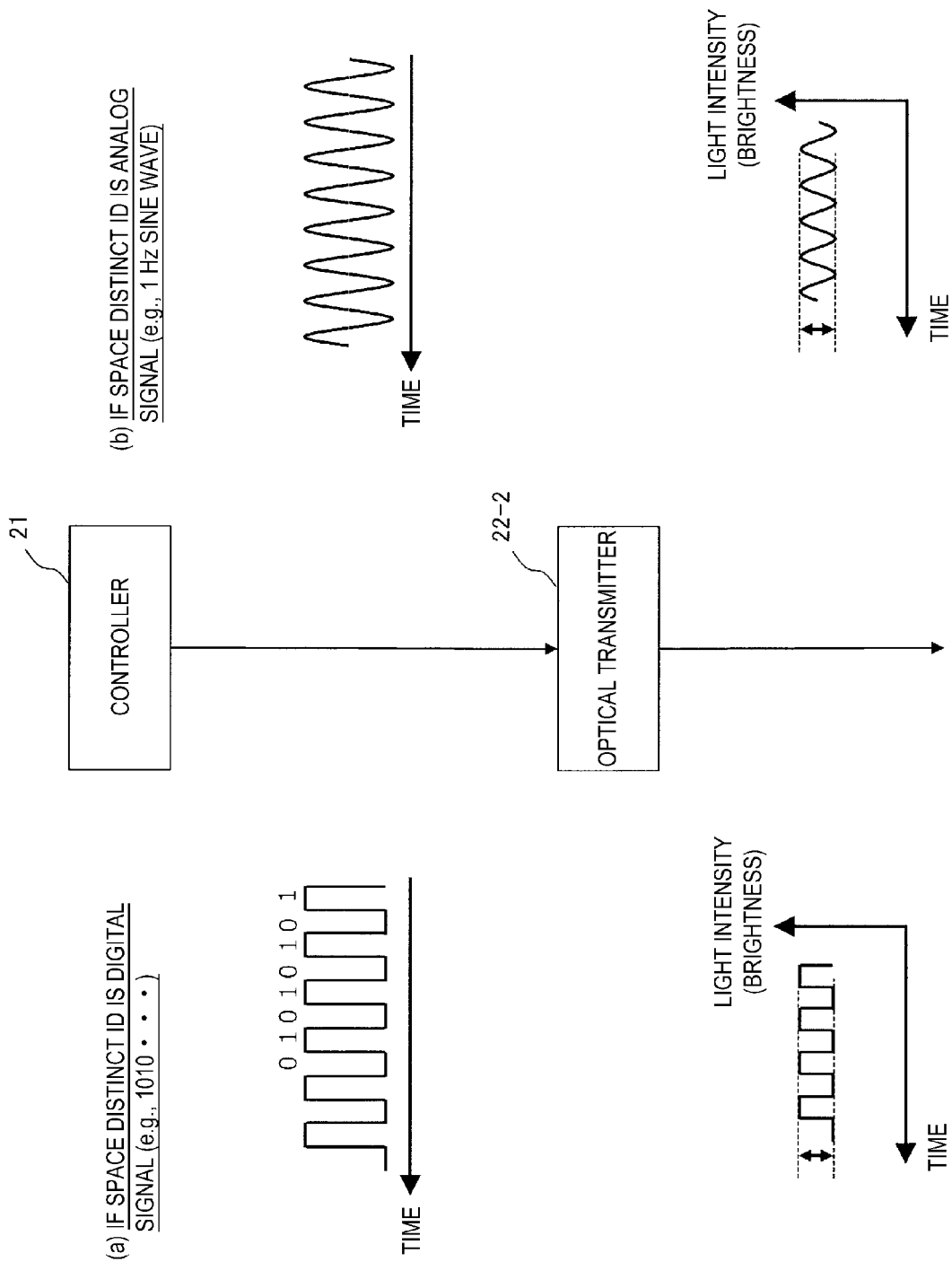
FIG. 7 illustrates a configuration example of a monitoring system according to an embodiment of the present disclosure.

FIG. 7 illustrates an example of generating an optical signal based on the space distinct ID. In FIG. 7, (a) illustrates the case where the space distinct ID is a digital signal, and (b) illustrates the case where the space distinct ID is an analog signal.

In FIG. 7, (a) is an example in which the space distinct ID control unit 12 generates a signal pattern "0101" based on the space distinct ID, and the optical transmitter 22-2 outputs an optical signal "0101" as a digital signal. When the optical transmitter 22-2 also has an illuminating function, bias light is included in the optical signal "0101" itself, as illustrated at (a) of FIG. 7, and the optical modulation degree of the optical signal output from the optical transmitter 22-2 is set to a predetermined percentage or less. When the illuminating function is not provided, the optical signal output from the optical transmitter 22-2 and the light from another lighting device separate from the optical transmitter 22-2 may be combined, and the optical modulation degree of both light beams may be set to a predetermined percentage or less.

In FIG. 7, (b) is an example in which the space distinct ID control unit 12 generates a repeating analog signal pattern based on the space distinct ID, and the optical transmitter 22-2 outputs a repeating optical signal as an analog signal.

When the optical transmitter 22-2 also has as an illuminating function, bias light is included in the repeating optical signal itself, as illustrated at (b) of FIG. 7, and the optical modulation degree of the optical signal output from the optical transmitter 22-2 is set to a predetermined percentage or less. When the illuminating function is not provided, the optical signal output from the optical transmitter 22-2 and the light from another lighting device separate from the optical transmitter 22-2 may be combined, and the optical modulation degree of both light beams may be set to a predetermined percentage or less.

The camera 25 has a light receiving characteristic according to the optical signal diffused by the optical transmitter 22-2. The camera 25 captures the image of the monitoring object in the location to be monitored 20 where the camera 25 is installed, while taking the optical signal diffused by the optical transmitter 22-2 into the capturing video image and transmitting the optical signal as the received signal to the storage unit 13 of the edge processing apparatus 10.

The storage unit 13 stores the received signal from the camera 25 corresponding to each location to be monitored in association with the location to be monitored.

The image analysis unit 14-2, which operates as the analysis unit, cuts out part of the received signal corresponding to a certain period of time stored in the storage unit 13 and extracts the space distinct ID embedded in the video image. Because the optical transmitter 22-2 diffuses the optical signal carrying the space distinct ID over a wide range of the location to be monitored, the image analysis unit 14-2 only needs to extract the space distinct ID according to a change of illuminance by focusing on a part of the image taken by the camera 25, for example, walls, floors, and ceilings other than the monitoring object. This makes it possible to extract the space distinct ID without being affected by the movement of people or objects. The image analysis unit 14-2 transmits the extracted space distinct ID, after associating it with the location to be monitored, to the abnormality determination unit 15. The operation of the abnormality determination unit 15 is similar to that of the first embodiment.

Figure 8:
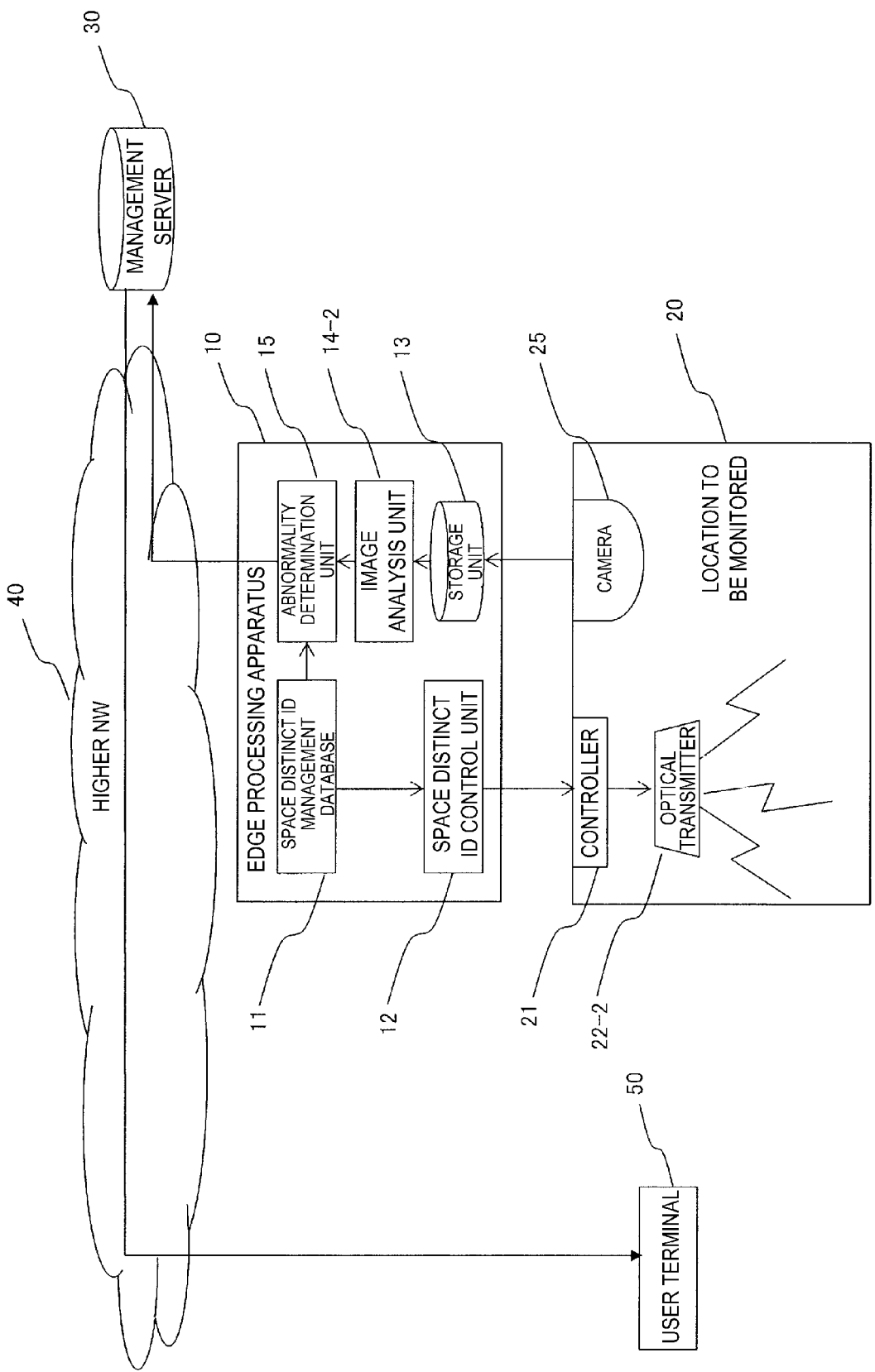
FIG. 8 illustrates an example of generating a space distinct ID.

As illustrated in FIG. 8, the monitoring system of the embodiment of the present disclosure may further include a management server 30. The operations of the abnormality determination unit 15, the management server 30, and the user terminal 50 in the monitoring system in FIG. 8 are similar to those of the second embodiment.

Thus, according to the monitoring system and the monitoring method of the embodiment of the present disclosure, the installer can remotely confirm that the security camera is installed at the "originally intended position" as intended by the installer.

Modification of the Embodiment

Figure 9:
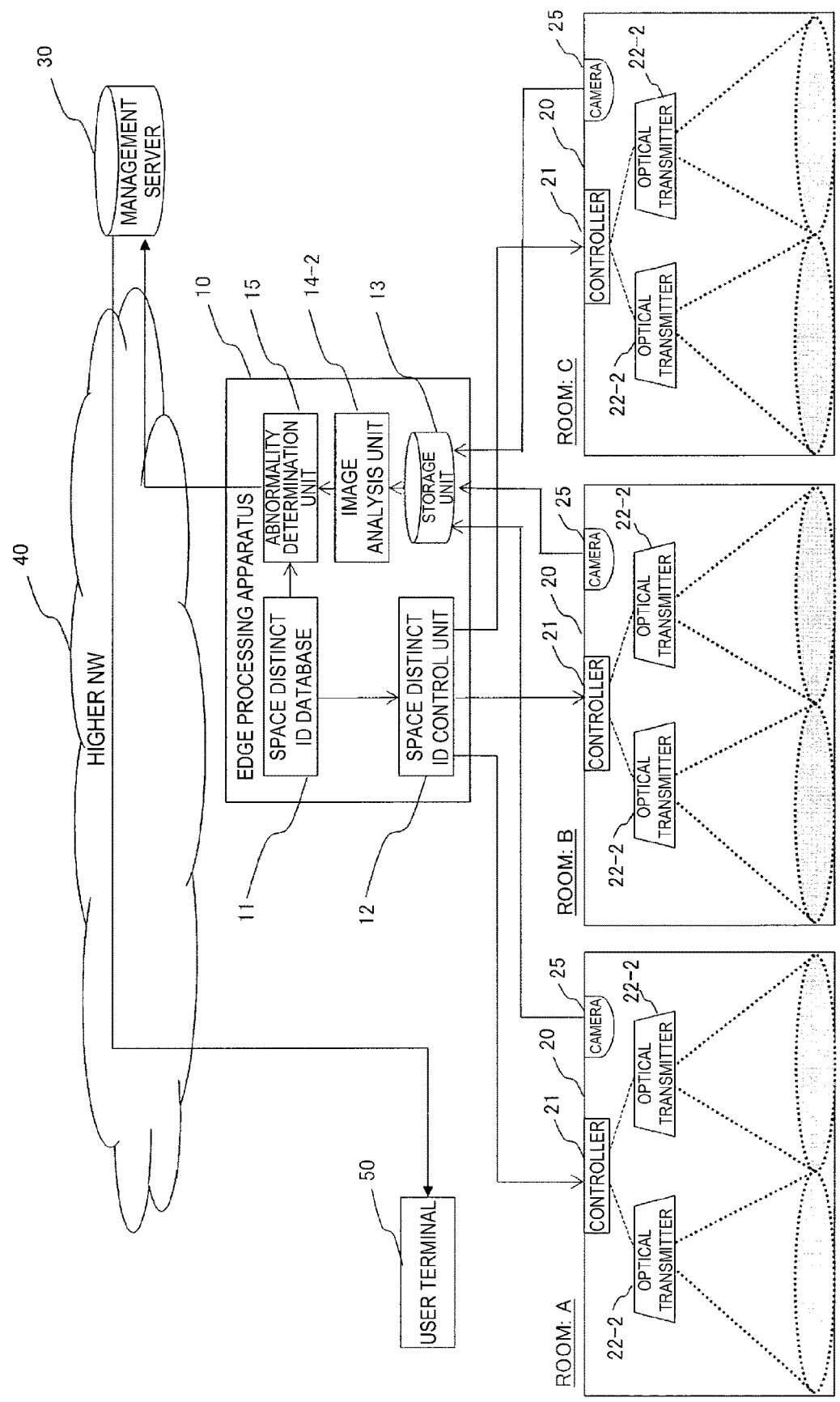
FIG. 9 illustrates a configuration example of a monitoring system according to an embodiment of the present disclosure.
Figure 10:
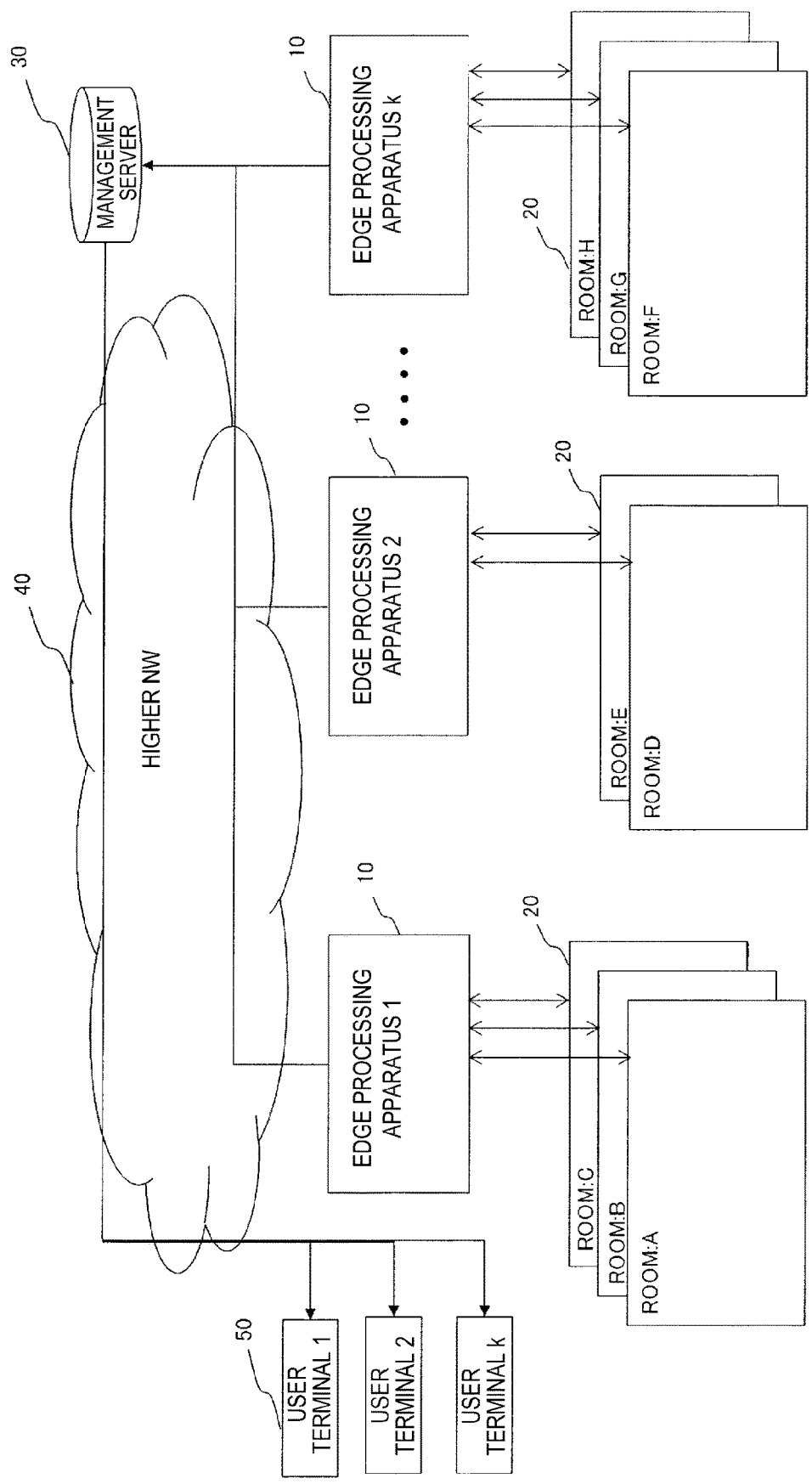
FIG. 10 illustrates a configuration example of a monitoring system according to an embodiment of the present disclosure.

The modifications of the first to third embodiments are illustrated in FIGS. 9 and 10. As illustrated in FIG. 9, one edge processing apparatus 10 may monitor a plurality of location to be monitored 20. In addition, as illustrated in FIG. 9, one controller 21 of each location to be monitored 20 may transmit the same space distinct ID to the plurality of optical transmitters or may transmit different space distinct IDs to each of the plurality of optical transmitters.

Alternatively, as illustrated in FIG. 10, the management server 30 may manage a plurality of edge processing apparatuses 10 or may support a plurality of user terminals 50.

Effects of the Invention

According to the monitoring system and the monitoring method of embodiments of the present disclosure, the installer can remotely confirm that the security camera has been installed at the "originally intended position" as intended by the installer. When the user terminal receives the alert, it can be recognized that the security camera has been moved from the "originally intended position" or that the security camera is in the abnormal state.

INDUSTRIAL APPLICABILITY

The present disclosure can be applied to information and communication industries.

REFERENCE SIGNS LIST

10: Edge processing apparatus
11: Space distinct ID management database
12: Space distinct ID control unit
13: Storage unit
14: Analysis unit
14-2: Image analysis unit
15: Abnormality determination unit
20: Location to be monitored
21: Controller
22: Transmitter
22-2: Optical transmitter
23: Camera with sensor
25: Camera
30: Management server
40: Higher network
50: User terminal

The invention claimed is:
1. A monitoring system comprising:
an edge processing apparatus including a space distinct ID management database, a space distinct ID control unit, a storage unit, an analysis unit, and an abnormality determination unit; and
a controller, a transmitter, and a camera with sensor that are installed in a location to be monitored, wherein
the space distinct ID management database stores a space distinct ID and a transmission time of the space distinct ID in association with the location to be monitored,
the space distinct ID control unit acquires the space distinct ID associated with the location to be monitored from the space distinct ID management database and transmits the space distinct ID that is acquired to the controller in the associated location to be monitored,
the controller transmits the space distinct ID acquired from the space distinct ID control unit to the transmitter,
the transmitter generates a signal based on the space distinct ID acquired from the controller and diffuses, in a space of the location to be monitored, the signal that is generated,
the camera with sensor includes a sensor that captures an image of the location to be monitored where the camera with sensor is installed and receives the signal diffused by the transmitter, and the camera with sensor transmits a received signal received by the sensor to the storage unit,
the storage unit stores the received signal received from the camera with sensor in association with the location to be monitored where the camera with sensor is installed, the analysis unit extracts a space distinct ID from the received signal stored in the storage unit and transmits the space distinct ID that is extracted to the abnormality determination unit in association with the location to be monitored, and the abnormality determination unit compares and determines whether there is a match between the space distinct ID associated with the location to be monitored from the analysis unit and current time, and the space distinct ID and the transmission time of the space distinct ID associated with the location to be monitored that are stored in the space distinct ID management database.

2. The monitoring system according to claim 1, further comprising a management server, wherein when there is no match between the space distinct ID associated with the location to be monitored from the analysis unit and the current time, and the space distinct ID and the transmission time of the space distinct ID associated with the location to be monitored that are stored in the space distinct ID management database, the abnormality determination unit transmits, to the management server, abnormality and an unmatched location to be monitored, and the management server transmits abnormal states aggregated from the abnormality determination unit to a user terminal corresponding to the location to be monitored.

3. The monitoring system according to claim 1, wherein the transmitter diffuses light in the location to be monitored as the signal generated based on the space distinct ID and a camera itself of the camera with sensor is also a sensor, and the camera with sensor transmits a signal captured by the camera to the storage unit as the received signal.

4. An edge processing apparatus comprising:

a space distinct ID management database;

a space distinct ID control unit;

a storage unit;

an analysis unit; and an abnormality determination unit, wherein the space distinct ID management database stores a space distinct ID and a transmission time of the space distinct ID in association with a location to be monitored, the space distinct ID control unit acquires the space distinct ID associated with the location to be monitored from the space distinct ID management database and transmits the space distinct ID that is acquired to the associated location to be monitored, the storage unit stores a received signal received from the associated location to be monitored in association with the associated location to be monitored, the analysis unit extracts a space distinct ID from the received signal stored in the storage unit and transmits the space distinct ID that is extracted to the abnormality determination unit in association with the location to be monitored, and the abnormality determination unit compares and determines whether there is a match between the space distinct ID associated with the location to be monitored from the analysis unit and current time, and the space distinct ID and the transmission time of the space distinct ID associated with the location to be monitored that are stored in the space distinct ID management database.

5. The edge processing apparatus according to claim 4, wherein when there is no match between the space distinct ID associated with the location to be monitored from the analysis unit and the current time, and the space distinct ID and the transmission time of the space distinct ID associated with the location to be monitored that are stored in the space distinct ID management database, the abnormality determination unit externally transmits abnormality and an unmatched location to be monitored.

6. A monitoring method performed by a monitoring system including an edge processing apparatus including a space distinct ID management database, a space distinct ID control unit, a storage unit, an analysis unit, and an abnormality determination unit, and a controller, a transmitter, and a camera with sensor that are installed in a location to be monitored, the monitoring method comprising:

by the space distinct ID management database, storing a space distinct ID and a transmission time of the space distinct ID in association with the location to be monitored;

by the space distinct ID control unit, acquiring the space distinct ID associated with the location to be monitored from the space distinct ID management database and transmitting the space distinct ID that is acquired to the controller in the associated location to be monitored;

by the controller, transmitting the space distinct ID acquired from the space distinct ID control unit to the transmitter;

by the transmitter, generating a signal based on the space distinct ID acquired from the controller and diffusing, in a space of the location to be monitored, the signal that is generated;

by the camera with sensor including a sensor that captures an image of the location to be monitored where the camera with sensor is installed and receiving the signal diffused by the transmitter, transmitting a received signal received by the sensor to the storage unit;

by the storage unit, storing the received signal from the camera with sensor in association with the location to be monitored where the camera with sensor is installed;

by the analysis unit, extracting a space distinct ID from the received signal stored in the storage unit and transmitting the space distinct ID that is extracted to the abnormality determination unit in association with the location to be monitored; and by the abnormality determination unit, comparing and determining whether there is a match between the space distinct ID associated with the location to be monitored from the analysis unit and current time, and the space distinct ID and the transmission time of the space distinct ID associated with the location to be monitored that are stored in the space distinct ID management database.

7. The monitoring method according to claim 6, wherein the monitoring system further includes a management server, when there is no match between the space distinct ID associated with the location to be monitored from the analysis unit and the current time, and the space distinct ID and the transmission time of the space distinct ID associated with the location to be monitored that are stored in the space distinct ID management database, the abnormality determination unit transmits, to the management server, abnormality and an unmatched location to be monitored, and the management server transmits abnormal states aggregated from the abnormality determination unit to a user terminal corresponding to the location to be monitored.

8. A non-transitory computer-readable medium having computer-executable instructions that, upon execution of the instructions by a processor of a computer, cause the computer to function as the edge processing apparatus according to claim 4.

* * * * *